US008254355B2

(12) United States Patent
Park

(10) Patent No.: US 8,254,355 B2
(45) Date of Patent: Aug. 28, 2012

(54) METHOD AND APPARATUS FOR UTILIZING A SECOND RECEIVER TO ESTABLISH TIME AND FREQUENCY

(75) Inventor: Edwin C. Park, San Diego, CA (US)

(73) Assignee: Airhop Communications, Inc., San Diego, CA (US)

( * ) Notice: Subject to any disclaimer, the term of this patent is extended or adjusted under 35 U.S.C. 154(b) by 530 days.

(21) Appl. No.: 12/501,298

(22) Filed: Jul. 10, 2009

(65) Prior Publication Data

US 2010/0067507 A1  Mar. 18, 2010

Related U.S. Application Data

(60) Provisional application No. 61/192,458, filed on Sep. 17, 2008.

(51) Int. Cl.
*H04J 3/06* (2006.01)
(52) U.S. Cl. ........ 370/338; 370/350; 370/342; 370/503; 370/507; 455/501; 455/574
(58) Field of Classification Search .................. 370/338, 370/350, 324, 342, 331, 503, 507; 455/501, 455/574, 456.1
See application file for complete search history.

(56) References Cited

U.S. PATENT DOCUMENTS

| 5,561,701 | A  | * | 10/1996 | Ichikawa | 340/7.26 |
|---|---|---|---|---|---|
| 5,901,136 | A  | * | 5/1999 | Lovelace et al. | 370/217 |
| 6,112,100 | A  | * | 8/2000 | Ossoinig et al. | 455/502 |
| 7,917,113 | B2 | * | 3/2011 | Palenius et al. | 455/208 |
| 7,957,355 | B1 | * | 6/2011 | Heiferling et al. | 370/338 |
| 2003/0087655 | A1 | * | 5/2003 | Matsuoka | 455/502 |
| 2004/0100582 | A1 | * | 5/2004 | Stanger | 348/515 |
| 2005/0198247 | A1 | * | 9/2005 | Perry et al. | 709/223 |
| 2005/0249171 | A1 | * | 11/2005 | Buckley et al. | 370/338 |
| 2006/0258349 | A1 | * | 11/2006 | Rager et al. | 455/433 |
| 2009/0047945 | A1 | * | 2/2009 | Zhang et al. | 455/424 |

* cited by examiner

*Primary Examiner* — Ricky Ngo
*Assistant Examiner* — Rasheed Gidado
(74) *Attorney, Agent, or Firm* — Gazdzinski & Associates, PC

(57) ABSTRACT

Apparatus and methods for synchronizing a network element (e.g. access points, femtocells, etc.) to a master network (such as a cellular network) to provide accurate frequency and/or time references for their internal systems. In one embodiment, the network element utilizes a dedicated receiver (or transceiver) to receive timing information from the master network. The implementation of the dedicated receiver is advantageous for cost and simplicity reasons. Furthermore, the timing or frequency information, as received from the master network, is used to correct the network element's internal timing. In addition, the network element's internal timing can operate in open-loop mode, if no master network can be found, thereby allowing for the device to continue providing service to network users. Additionally, a dedicated receiver can also receive information (e.g. location, SID, NID, SSID, etc.) local to the network element, such information may be useful or required for seamless operation within the master network.

38 Claims, 10 Drawing Sheets

METHOD AND APPARATUS FOR UTILIZING A SECOND RECEIVER TO ESTABLISH TIME AND FREQUENCY

PRIORITY AND RELATED APPLICATIONS

This application claims priority to U.S. provisional patent application Ser. No. 61/192,458 filed Sep. 17, 2008 entitled "METHOD AND APPARATUS FOR UTILIZING A SECOND RECEIVER TO ESTABLISH TIME AND FREQUENCY", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of mobile communications. More particularly, in one exemplary aspect, the present invention is directed to synchronizing one network element's timing (e.g., slave) with that of another (e.g., master) network or network element.

2. Description of Related Technology

Many network elements in both wired and wireless networks needs to have accurate timing and frequency information. Time, phase, or frequency need to be accurate within the margin of error allowed by the system. Some systems require only frequency to be synchronized. Alternatively, some systems require only time to be synchronized. Some systems require both time and frequency to be synchronized. Yet further, some systems are not synchronized at all, but accurate timing and/or frequency information are needed on both sides of the communications devices for the system to function properly.

The aforementioned network elements can physically be located apart from one another. Also, they can be powered on and off independently. The oscillators on the network elements are not shared. In this environment, synchronizing the time/phase and frequency of the system within a designated margin or error requires some communication between the elements being synchronized.

This synchronization is required to facilitate many tasks and applications. For example, for two devices on the network to make simultaneous measurements, the time has to be synchronized. Such a situation exists commonly in test equipment.

Also, to hand off from one network to another network or one station to another station, frequency and time need to be synchronized. To receive and transmit data correctly across the network, the frequency reference used has to be accurate to a prescribed tolerance. Similarly, to reduce the buffering requirements on a streaming application, time needs to be synchronized. To prevent a loss of a frame in a streaming application, the frequency needs to be synchronized. Many other examples will be recognized by those of ordinary skill.

In the particular case of a cellular network, the user equipment (UE) and the basestation need to be frequency-aligned in order to communicate with each other. The UE typically locks its frequency to that of the basestation(s). Basestations get their frequency reference from the network, from a GPS receiver, or in some cases a highly accurate but expensive oscillator.

Furthermore, the user device or terminal (e.g., cellular phone) needs to be able to "hand-off" from one basestation to another; i.e., migrate from one geographic coverage area associated with a first base station to another associated with a second base station. To aid this hand-off, the user terminal needs to measure the signal of the neighboring basestation to which it will be migrating. To facilitate this measurement, the timing of the basestation(s) can be aligned so as to shorten the time window that the user terminal needs to measure for each basestation. Also, when handing off to another basestation, the terminal needs to be frequency-aligned to the new (receiving) basestation so that it can lock into the RF signal of that basestation. In this example, both time and frequency synchronization are important.

Furthermore, it is noted that different cellular standards have different tolerance and requirements for the accuracy of frequency and time. CDMA (i.e. IS-95 and IS-2000) require both time and frequency to be accurate. GSM requires frequency to be accurate, but has a less stringent requirement for time.

Network based synchronization techniques (e.g. IEEE-1588, T1, E1, etc.) use the network (e.g. Ethernet or GPIB) to synchronize time and/or frequency. One such exemplary standard—IEEE-1588, provides sub-microsecond synchronization of real-time clocks in components of the network. While such network synchronization techniques are simple and relatively inexpensive to implement, they are typically intended for relatively localized system. Network based synchronization techniques can work on larger systems with larger errors and/or a longer synchronization time.

An atomic-based oscillator (e.g., Cesium or other atomic clock) is possibly the most accurate means to keep time. First, the network elements are synchronized, and subsequently the atomic-based oscillator is used to maintain the system time. For example, GPS satellites use this method to keep time synchronization. Depending on the acceleration experienced by the network element, compensation for acceleration must be made. The most salient disadvantage of this method is the great expense.

GPS (Global Positioning System) provides for a very accurate, sub-nanosecond time reference. Also, GPS provides geographic location data. Though the prices of GPS solutions in the past have been high, recent advancements in chipsets (integrated circuits) have brought the price of GPS suites down to a moderate, though not inexpensive, price point. However, the comparatively low link budget (loosely translated—radiated power) for the GPS system does not allow for the signal to reach with any certainty indoor locations, or those where obstructions are present. At a minimum, the network element using the GPS system has to be able to "see" four (4) GPS satellites in order to obtain a fix, though a more accurate measurement can be made if it can "see" more satellites within the constellation. Many cellular basestations use GPS to keep the time and frequency synchronized.

In another approach, television signals may be used to get an accurate timing and frequency reference. Much like the GPS system, a system using television signals can also provide location. One such implementation is described in U.S. Pat. No. 6,839,024. Unlike GPS, TV signals penetrate further into buildings and structures. In addition to the TV station, a location and timing servers are required in the system. Furthermore, monitor stations that are located via GPS are required. Also, a TV phase center database is required. Basically, the user terminal locates itself, and determines the time in a manner similar to GPS. It measures the pseudo-ranges of the stations, and uses a database to determine the location and uses that information to calculate time. Due to the system-level components required, there is significant additional cost and complexity associated with this solution.

As yet another approach, direct connectivity may be used; i.e., where the system directly connects the elements needing the synchronization. There are many ways to accomplish this synchronization, including e.g., via a SERDES (serializer-deserializer) device, which may decode embedded data to provide for clock recovery. This is often used on an equipment rack or other such installations. However, this method generally cannot be used in a public network since there cannot be a direct connection between the elements in such applications.

Network elements (i.e., any networked object) often need to have either timing or frequency lock/synchronization/accuracy. The network elements can lock to a central source (i.e. Master reference), or to each other. An element can be frequency locked, yet not time locked. In this case, there will be a DC offset in time. An element can also be time locked, yet not frequency locked. In this case, the time will drift. Frequency error compounds to time errors.

If the frequency error averages zero (0) over long periods of time, the time error will be bounded. However, if there is a bias in the frequency error, the time error will grow unbounded, so there must be a mechanism to adjust the time in addition to frequency.

Many applications need to have this type of synchronization. One such example is in a cellular network, where a user terminal moves between multiple basestations. Another example is in the case of measurements made by physically disparate devices such as test equipment. Yet another application comprises streaming applications such as those used for video or multimedia. All three of the foregoing examples have different system needs for time and/or frequency synchronization.

Accordingly, improved methods and apparatus are needed for providing accurate clocking (timing) and/or frequency information over a public network, that also are cost effective and efficient to manufacture and use. Ideally such improved apparatus and methods would require no significant modification or additions to extant infrastructure or communications protocols, and would allow for a great degree of flexibility in terms of operational implementation (e.g., could be used with various physical device configurations, network topologies, and communications protocols/air interfaces). It would also make maximal use of COTS (off-the-shelf) or commodity components so as to further reduce cost.

SUMMARY OF THE INVENTION

The present invention satisfies the foregoing needs by providing, inter alia, improved methods and apparatus for providing time and/or frequency reference between two components or two networks.

In one aspect, the invention discloses a method of operating a device (e.g., femtocell, picocell, macrocell, etc. within a wireless network) so as to provide at least one of a time and/or frequency reference. In one variant, the method comprises using a second receiver within the femtocell to access precision trimming and/or frequency information from another network. This approach obviates the cost and complexity associated with providing more precise/accurate timing and frequency reference sources, while requiring no modification to user equipment or network infrastructure.

In a second aspect, an improved network apparatus (e.g., femtocell) is disclosed which is adapted to obtain a time and/or frequency reference (as well as optionally other information including location data and SID) from an external network. In one variant, the network apparatus is for use in an LTE or WiMAX network, and can obtain the aforementioned reference and data from a "master" GSM or CDMA-based cellular network.

In a third aspect, a method of providing wireless coverage even without access to a high-accuracy timing or frequency sources disclosed. In one embodiment, the method comprises configuring a femtocell or similar apparatus such that it can operate on its own internal (low cost but less precise) oscillator for purposes of servicing users within the coverage of the cell. The femtocell periodically attempts to synchronize with a suitable master; however, if no master is available, at least some operations of the femtocell continue unabated (i.e., those which do not require accurate synchronization with an external network).

In a fourth aspect, methods of doing business relating to the aforementioned approach and apparatus are disclosed. In one embodiment, the methods comprise manufacturing a lower cost femtocell or similar apparatus, and distributing it to one or more locations within the network. Cost of the femtocell is reduced based on, inter alia, (i) the ability to avoid use of an expensive or complex time/frequency reference, and (ii) the ability to use commodity or COTS receiver or transceiver apparatus within the femtocell in order to provide access to the more precise (external) reference.

In another aspect of the invention, other types of information (e.g., location information, SID, etc.) can be received at one network element from another network element via a secondary network interface.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
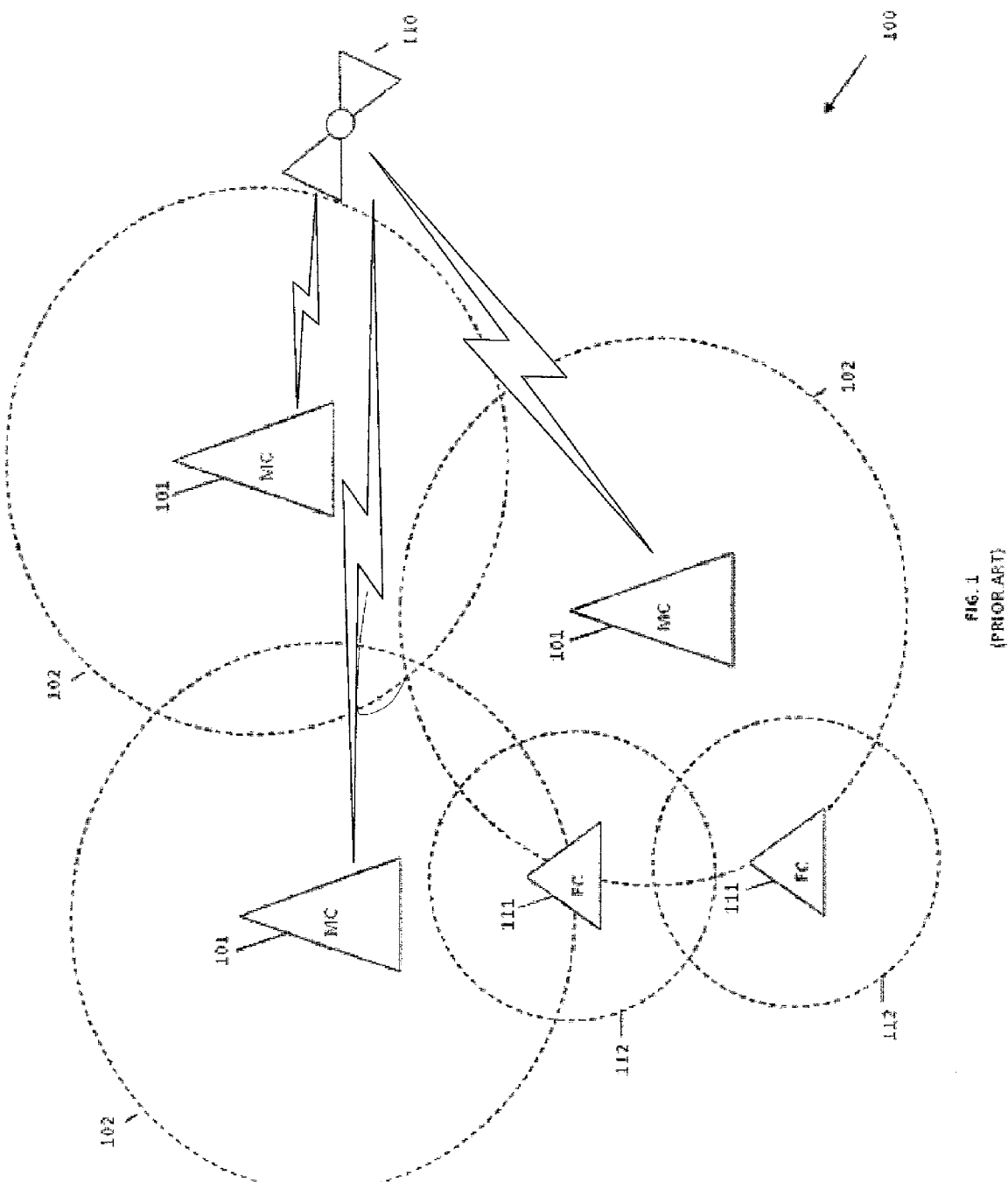
FIG. 1 is a functional block diagram of a typical prior art cellular system.

Reference is now made to the drawings, wherein like numerals refer to like parts throughout.

As used herein, the terms "mobile device", "client device" and "user device" include, but are not limited to laptop or handheld computers, PDAs, video cameras, personal media devices (PMDs), cellular telephones, smartphones, or any combinations of the foregoing.

As used herein, the terms "femtocell" and "base station" generally refers without limitation to any "femtocell", "picocell", "microcell", "macrocell", base station type device, etc. and also includes without limitation: non cellular stations such as access points, relay points, repeater devices, etc.

As used herein, the term "cellular" refers without limitation to any wireless telecommunications (and/or data) apparatus or system providing multiple user access including for example those of the 2G, 2.5G, 3G, 4G, or AMPS families. Well known cellular standards and technologies include e.g., LTE, UMTS, GSM, 3GPP/WCDMA, 3GPP2 (CDMA2000), IS-95, IS-136, IS-54, NAMPS, WiMAX, and PCS-1900.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "clock", "oscillator" include any type of integrated circuit or other device adapted for generating a timing reference including, without limitation, oscillators, crystal oscillators (XO), voltage controlled crystal oscillators (VCXO), voltage controlled temperature controlled crystal oscillators (VCTCXO), phase locked loop (PLL), digital phase locked loop (DPLL), analog phase locked loop (APLL), delay locked loop (DLL), etc.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "network" and "bearer network" refer generally to any type of data, telecommunications or other network including, without limitation, data networks (including MANs, PANs, WANs, LANs, WLANs, micronets, piconets, internets, and intranets), hybrid fiber coax (HFC) networks, satellite networks, and telco networks (including for example cellular networks). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, 802.11, 802.16, ATM, X.25, Frame Relay, 3GPP, 3GPP2, WAP, SIP, UDP, FTP, RTP/RTCP, H.323, etc.).

As used herein, the term "WiMAX" refers without limitation to, as applicable, IEEE-Std. 802.16-2004 (often referred to as 802.16d) entitled "IEEE Standard for Local and metropolitan area networks—Part 16: Air Interface for Fixed Broadband Wireless Access Systems" dated Oct. 1, 2004, IEEE Standard 802.16e entitled "IEEE Standard for Local and metropolitan area networks—Part 16: Air Interface for Fixed and Mobile Broadband Wireless Access Systems— Amendment 2: Physical and Medium Access Control Layers for Combined Fixed and Mobile Operation in Licensed Bands and Corrigendum 1", and IEEE-Std. 802.16m, and any revisions thereof, which are individually and collectively incorporated herein by reference in their entirety.

As used herein, the term "wireless" means any wireless signal, data, communication, or other interface including without limitation LIE, Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

Network elements such as Wi-Fi access points (APs) and base stations must be synchronized to their serving networks to provide accurate frequency and/or time references for their internal systems, and the other network elements with which they interact, so as to facilitate functions such as e.g. data communication, authentication, etc. Such timing may additionally be required for software applications (i.e., buffering and frame rates). The accuracy level of such synchronization requires a hardware solution. Current implementations of synchronization circuits are very costly and complex to implement.

In one aspect of the present invention, methods are disclosed which utilize a "master" network (such as a first LTE, WiMAX, CDMA, GSM, etc. cellular network or Wi-Fi access point), to synchronize the frequency and/or time to that generated by the "slave" network element (e.g. femtocell, access point, etc.). In one embodiment, the slave network element identifies one or more suitable master networks, and extracts one or more timing or frequency references from that master network. Utilizing the extracted master timing/frequency references, the slave network element corrects its internal timing or frequency, and generates a slaved timing/frequency reference.

Furthermore, while methods are described for synchronizing the slave network element with the master network (i.e. "closed-loop" operation), the disclosed method also enables operation of the base station or AP in a standalone mode (i.e. "open-loop" operation) so that it can none-the-less fulfill its primary functionality of providing communication to users, irrespective of whether an external reference is available or not.

In another aspect, apparatus comprising one or more receivers (or transceivers) are disclosed which receive a frequency and/or time reference from a master network, and generate a second slave frequency and/or time reference. In one embodiment of the present invention, a network element apparatus is disclosed which utilizes a commodity or low-cost receiver section (such as that of a mobile station) to determine the timing reference from a master network, in a manner identical to a mobile station. The network element apparatus utilizes the received timing reference from the master network to synchronize its internal time and or frequency reference.

Furthermore, while apparatus are provided to synchronize the slave network element with the master network, the apparatus is equally able to operate in isolation, by utilizing its internal timing reference in open-loop operation as previously referenced.

Advantageously, the various exemplary embodiments of the invention avoid any changes to extant communications protocols for either the "master" or "slave" networks, and make use of existing capabilities within those networks (such as the highly precise timing and/or frequency apparatus of large cellular macrocells, transceiver sections of mobile devices, etc.). Hence, one can simply "drop in" a femtocell, picocell, microcell, etc. or other such apparatus configured according to the present invention within the existing slave (e.g., LTE, WiMAX, etc.) network, and it will be able to obtain the desired timing and/or frequency reference(s) seamlessly and without any changes or upgrades to the slave network, or the parent (master; e.g., CDMA, GSM, etc.) network from which it is obtaining the reference(s). Such a network element can also be produced at a very low cost compared to existing technologies, since the complex and expensive time- and/or frequency-keeping apparatus used in prior art macrocells is obviated by the "piggyback" or parasitic approach of the present invention (i.e., a low cost crystal oscillator or the like, and a commodity mobile device transceiver, can be used in the network element instead).

Moreover, the various exemplary embodiments of the invention may be used to facilitate faster synchronization times in existing network apparatus. In one embodiment, the slave network element initially identifies one or more suitable master networks, and extracts one or more rough timing or frequency references from that master network. Concurrently, the slave element may also enable slower and more accurate timing or frequency references (e.g., GPS, etc.). Once the more accurate timing or frequency reference is locked, the slave element can transition over to the more accurate reference. The extracted master timing/frequency reference provides a stop gap solution to expedite slave network element initialization.

DETAILED DESCRIPTION OF EXEMPLARY EMBODIMENTS

Exemplary embodiments of the present invention are now described in detail. While these embodiments are primarily discussed in the context of a "slave" network element operating within a "master" network, it will be recognized by those of ordinary skill that the present invention is not so limited. Moreover, while discussed primarily in the context of interactions between a master and slave network entity of the cellular network, it is recognized that other implementations of either master or slave network functionality or timing/frequency synchronization functionality of the invention can be implemented at other points within the network without departing from the spirit and scope of the present invention.

Moreover, the present invention is in no way limited to cellular networks, and in fact may be used in any number of other types of networks, including both wireless and wireline. For example, in one embodiment, the present invention may be adapted for use within a Wi-Fi network, References [1] through [5] presented herein (see Appendix I), which are each incorporated by reference herein in their entirety, describe various exemplary timing and/or frequency requirements associated with various wireless networks.

Cellular Network Architecture—

As is well known, a cellular radio system comprises a network of radio cells each served by a transmitting station, commonly known as a cell site or base station (BS). The radio network provides wireless communications service for a plurality of transceivers (in most cases mobile transceivers such as cellular telephones or "smartphones"). The network of base stations working in collaboration allows for substantially seamless wireless service, which is greater than the radio coverage provided by a single serving base station. The individual base stations are connected by another network (in many cases a wired or millimeter wave network), which includes additional controllers for resource management, and in some cases access to other network systems (e.g., internets such as the Internet) or MANs/WANs.

FIG. 1 illustrates an exemplary cellular system 100. The cellular system 100 comprises a plurality of base stations or macrocells 101 that are set at various fixed geographic locations (although some base stations may be moveable in nature). Each of these base stations are characterized by their respective wireless coverage areas 102. Also depicted in FIG. 1 are femtocells 111, which are not necessarily (and typically are not) geographically fixed. These femtocells provide wireless coverage areas 112 that may overlap with those of other femtocells or macrocells, as shown. The femtocells augment the wireless coverage area provided by the network operator of the macrocells. The macrocells are synchronized using a precision timing reference (a GPS satellite 110 is shown; however in some systems the timing reference may be a very precise crystal oscillator, etc.). The femtocells must be synchronized to the network; however, they generally do not implement the same mechanisms that a base station would (for reasons described elsewhere herein).

Figure 1A:
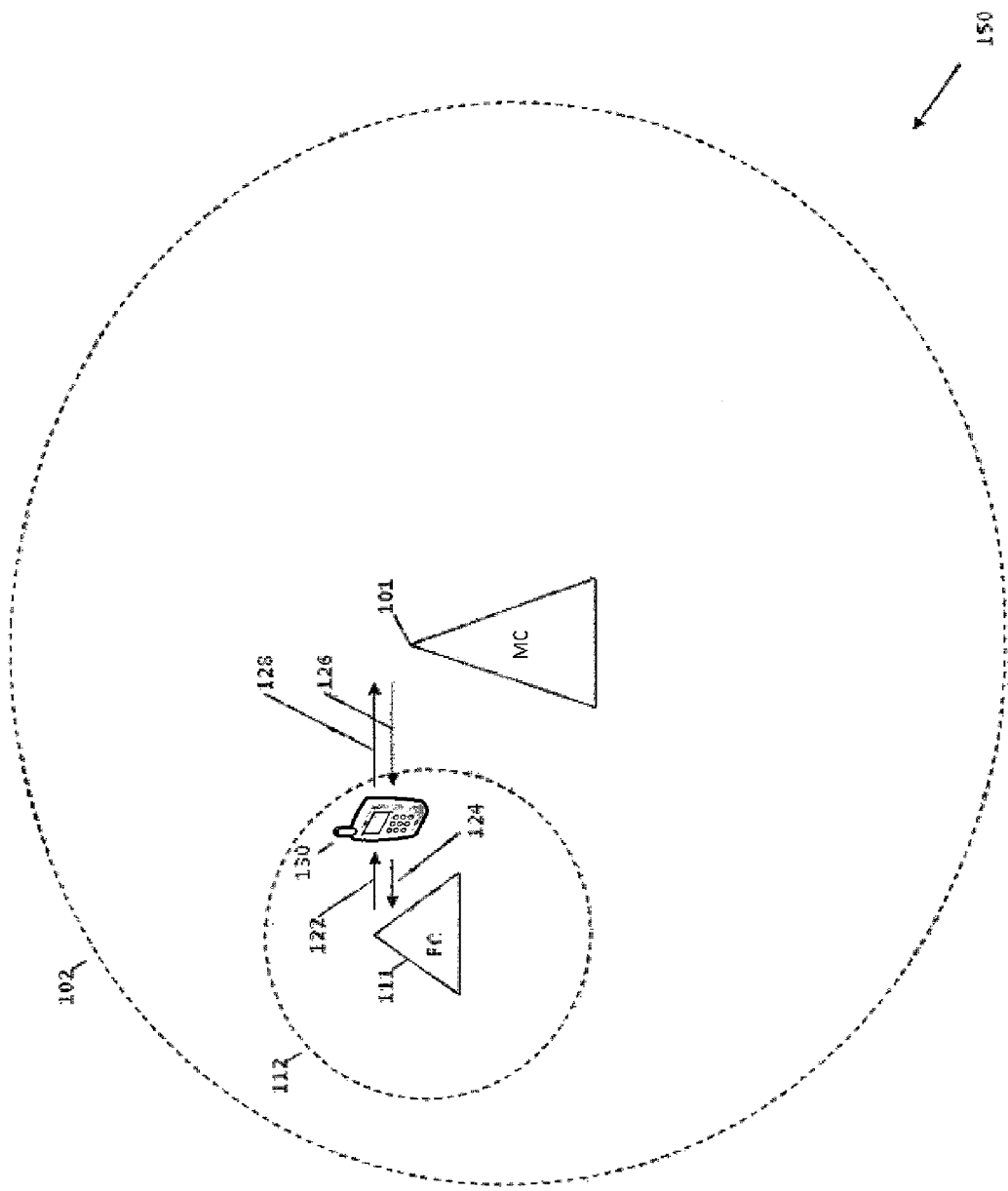
FIG. 1A is a functional block diagram of another prior art cellular system comprising a cellular phone, a femtocell, and a base station.

FIG. 1A is a simplified diagram of a cellular system illustrating an exemplary base station 101 that has a coverage area 102. Exemplary femtocell 111 has a coverage area 112, which is surrounded by or subsumed within the coverage area 102 of the macrocell 101. The base station 101 and femtocell 111 transmit system information periodically or continuously (e.g., via various control channels) to enable a mobile station 130 to connect and commence communication. As depicted, a mobile station (MS) lies in the coverage areas of both the femtocell and the macrocell. Both the femtocell and the macrocell are controlled by the same network provider in the illustrated configuration. Therefore, the mobile station may retain service from either the femtocell or the macrocell. Furthermore, the mobile station may also "hand-off" freely from the femtocell to the macrocell, and vice versa. The downlink 122 and uplink 124 channels of the femtocell and downlink 126 and uplink 128 channels of the macrocell, may be the same wireless system, but are not required to be so (and typically are not).

In the exemplary context of such a cellular network, one requirement of operation is that the network elements (e.g. the base stations 101, femtocells 111, etc.) must remain in synchronization to enable such functions as communication, cell search, hand-offs, etc. To satisfy this requirement, the femtocell must generate a timing reference for its operation which is time- and/or frequency-aligned with the macrocell network. Various systems have various requirements for a timing reference; such a reference might be a frequency reference, a time reference, or both.

Base stations or macrocells are sufficiently large investments of capital, and thus benefit from "economies of scale"; they implement an extremely precise timing reference, for a relatively small fraction of their entire cost. However, the significant difference in cost of a femtocell (the latter which typically costs orders of magnitude less than a base station) makes an identical timing reference implementation unduly burdensome. Therefore, one advantageous aspect of the present disclosure is the leveraging of a master network's (e.g., the base station's) timing reference, such as by determining from its transmitted control signals an appropriate timing reference for use within a slave network element (e.g., the femtocells).

Base stations get their frequency reference from the network, GPS (Global Positioning System), or an atomic clock. An atomic clock determines time using atomic resonance, and is possibly the most accurate method for time keeping. However, as previously discussed, atomic-based oscillator implementations are very expensive. Also as discussed, GPS provides a very accurate, sub-nanosecond time reference, but suffers from low link budget (radiated power), requires a minimum of four (4) GPS satellites to determine location and time, and is a comparatively expensive solution even with recent advances in chipset performance and cost.

Methods—

Figure 2:
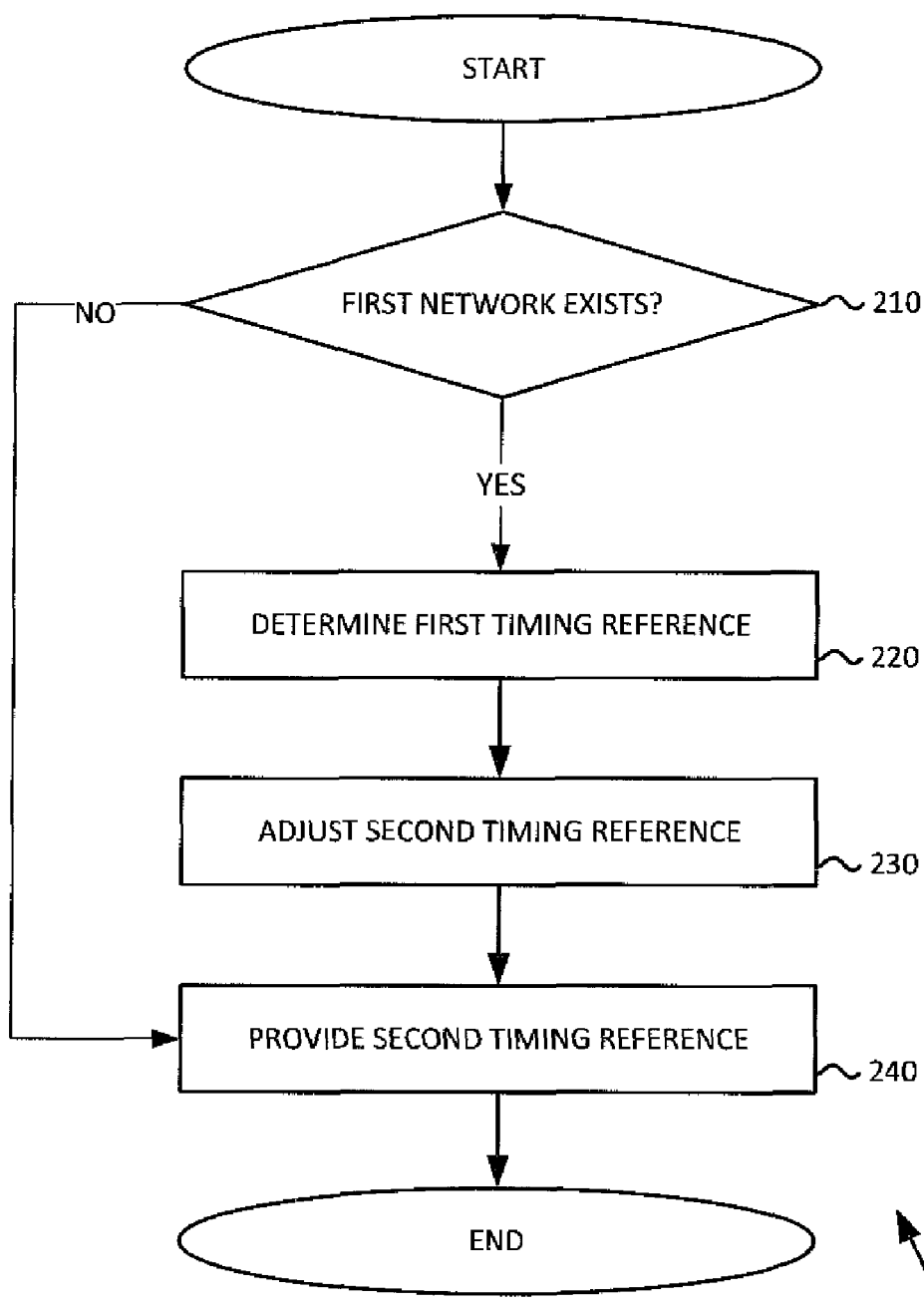
FIG. 2 is a logical flow diagram of one embodiment of the method of synchronization of timing utilizing a second receiver in accordance with the principles of the present invention.

Referring now to FIG. 2, a generalized procedure 200 for synchronizing the time and/or frequency elements of network devices within a master network according to one embodiment of the invention is illustrated.

At step 210, a network element first scans for a first (master) network. If the network element cannot identify a first network, then it skips to step 240, and operates in an "open-loop" (stand-alone) mode. In open-loop mode, the network element generates its own clock without any synchronization to an external network.

In one exemplary embodiment, the network element preferentially identifies one or more preferred master networks during the scan, although the network element may additionally identify any available network as part of the scan.

Step 210 can be performed on device power-up, periodically, and/or whenever the reception of a previously identified first (master) network is lost. Furthermore, step 210 may be performed on a periodic "wake-up" or opportunistic basis to conserve power, yet remain updated to the first network's status.

If the network element identifies a first (master) network, then at step 220 it extracts a first timing reference from that network. Such a timing reference may provide either a time value, frequency value, or both as a reference. In one exemplary embodiment, the network element demodulates the first network's RF transmissions in order to extract the reference. This may include demodulating one or more other wireless protocols (e.g., the invention may employ multiple air interfaces of similar or different type (e.g., cellular/cellular, cellular/WLAN, cellular/PAN, etc.) to broaden the number and type of external timing references onto which it can "piggyback". Additionally, the network element may be required to transmit messages to the first network, for a portion of such one or more wireless protocols (e.g., negotiate or authenticate for the ability to receive the required data). In one such exemplary variant, the network element is additionally adapted to demodulate the first network's control channel broadcasts.

The network element, having once acquired a first network, periodically, anecdotally (e.g., upon occurrence of a certain event), or even continuously demodulates the first network's transmissions, thus maintaining an updated first timing reference. In an alternate embodiment, the network element, having once acquired a first network, powers off to save power, periodically "wakes up" to re-acquire the first network.

In addition, at step 220, the network element may also optionally extract other or ancillary information from the first network. Such information may comprise qualities such as the location of a nearby base station (macrocell), received broadcast information (e.g., System IDs (SID), Network IDs (NID), Service Set IDs (SSID)), etc. This information, while not directly used for the determination of timing or frequency, may be required for the network element to operate (e.g. the network element may not be enabled to operate in all regions, etc.). The received ancillary information may also be used to allow communication between the network element and the "master" network's operator (e.g., to permit the network operator to query the femtocell, etc.).

Furthermore, as such information is extracted at the network element's unique position; the master network does not have a priori knowledge of the environment at the network element. Thus, in certain embodiments, the network element may be instructed to operate differently (e.g. synchronize, or not synchronize), based at least in part, on information extracted at this step.

At step 230, the network element creates a new timing reference (or adjusts its extant timing reference), thereby producing a second timing reference based at least in part on the first (extracted) timing reference. In one exemplary embodiment, such an adjustment is performed based on a correction (or error factor) generated by a comparison between the second timing reference, and the first timing reference. Such a comparison may be performed for example by comparing the frequency of the second timing reference with respect to the frequency of the first timing reference. Alternatively, such a comparison is accomplished by comparing the time value of the second timing reference with the time value of the first timing reference. As yet another alternative, such a comparison is accomplished based on a periodic "tick" generated by the first timing reference. (e.g., a pre-existing pilot or heartbeat signal used for synchronization purposes). It will also be appreciated that if the first network (master) has knowledge of the timing existing in the network element (e.g., femtocell), such as via the network element passing this information to the master, the master can generate a correction and send this to the network element (thereby obviating the network element having to perform the calculation itself).

In addition, at step 230, the network element may also optionally perform other operations to process ancillary information gathered from the first network. Such information may comprise determination of the location or other attributes of nearby base stations (macrocell), signal strength measurements correlated to broadcasted information, identification of nearby services, etc. (e.g., SIDs, NIDs, SSIDs, etc.), satellite reception, television programming information, etc. Reception and processing of various signals on the slave network interface local to the network element may be useful for the network operator (such as for providing localized information, not otherwise obtainable from a central location).

At step 240, the network element utilizes the generated/corrected second timing reference for one or more operations within the network element (or even for transmission to another entity in communication with the network element (see "Chained Network Element Operation"). As previously noted, this second timing reference may be either "open-loop" (i.e., uncorrected or autonomous from an external source), or "closed-loop" (i.e., corrected or slaved to an external master), depending on the determination made at step 210; i.e., whether a suitable external master reference was available.

At step 240, the network element may also optionally communicate ancillary information, or the results of ancillary processing to the network provider.

Figure 2A:
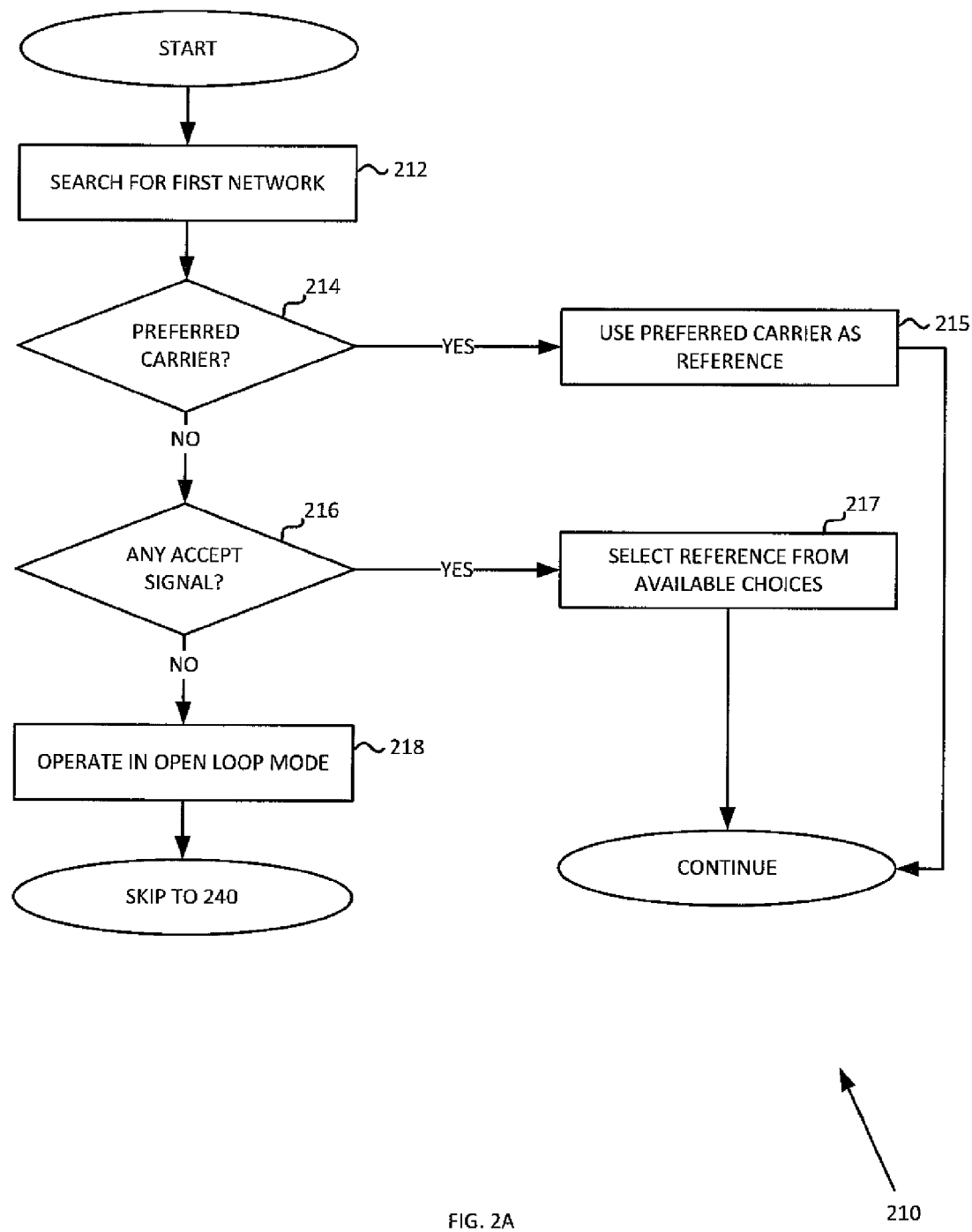
FIG. 2A is a logical flow diagram of one embodiment of the method for searching for a first network utilizing a second receiver in accordance with the method of FIG. 2.

Referring now to FIG. 2A, one exemplary implementation of the scanning process of step 210 is illustrated with respect to an invention enabled femtocell or base station device operating in conjunction with a cellular network.

At step 212, an invention enabled femtocell or base station device initiates a scan or discovery of the air interface. This scan comprises in one variant a "blind" search for a macrocell downlink channel 126. The femtocell scans one or more physical resources (e.g. time slots, frequency bands, etc.), for a sufficiently long time interval to detect any potential neighboring base stations having sufficient transmit power. For certain technologies (e.g. CDMA and other spread spectrum systems), a detection of radio transmit power may be insufficient; instead, the femtocell may be required to perform an initial receiver operation (e.g. correlate against a specified pseudo-noise sequence (PN), etc.), or employ other techniques useful for detecting such spread-spectrum waveforms.

At step 214, the invention enabled femtocell or base station device searches for one or more preferred carriers associated with its network operator. Such a "preferred" carrier is desirable, as the femtocell ideally offers service synchronously with the network operator. If a preferred carrier's macrocell is identified, then at step 215, the femtocell identifies the most desirable downlink signal 126 (e.g., highest signal-to-noise ratio (SNR), lowest bit error rate (BER), and/or other criteria).

If such a preferred carrier cannot be identified, then the invention enabled femtocell or base station device may search for one or more alternate signals 216 (e.g., base stations operated by a different carrier entity, non-cellular wireless networks, etc.) which offer an acceptable timing reference, provided that the femtocell is enabled to do so. If the femtocell identifies one or more acceptable signals, then at step 217, the femtocell identifies the downlink signal 126 (similar to step 215 above).

If no such signal is identified, then the invention enabled femtocell or base station device switches to "open-loop" mode 218. As noted previously, open-loop mode comprises the femtocell generating its own clock without any synchronization to an external network. Synchronization with the network is useful to enable cooperation between the base stations and the femtocells; thus, if the femtocell cannot identify any neighboring base stations, then these benefits are negated. The femtocell can operate in isolation from the network operator's macrocell unsynchronized without any additional impact to the perceived quality of the mobile station (e.g. dead spots, the mobile station cannot hand off to other base stations, etc. anyway). However, the femtocell may also be programmed to retry its discovery protocol (i.e., steps 214 through 216 above) after a period of time and open-loop operation, if desired. It may also be programmed to alter its search parameters or strategy to locate a suitable external reference.

Figure 2B:
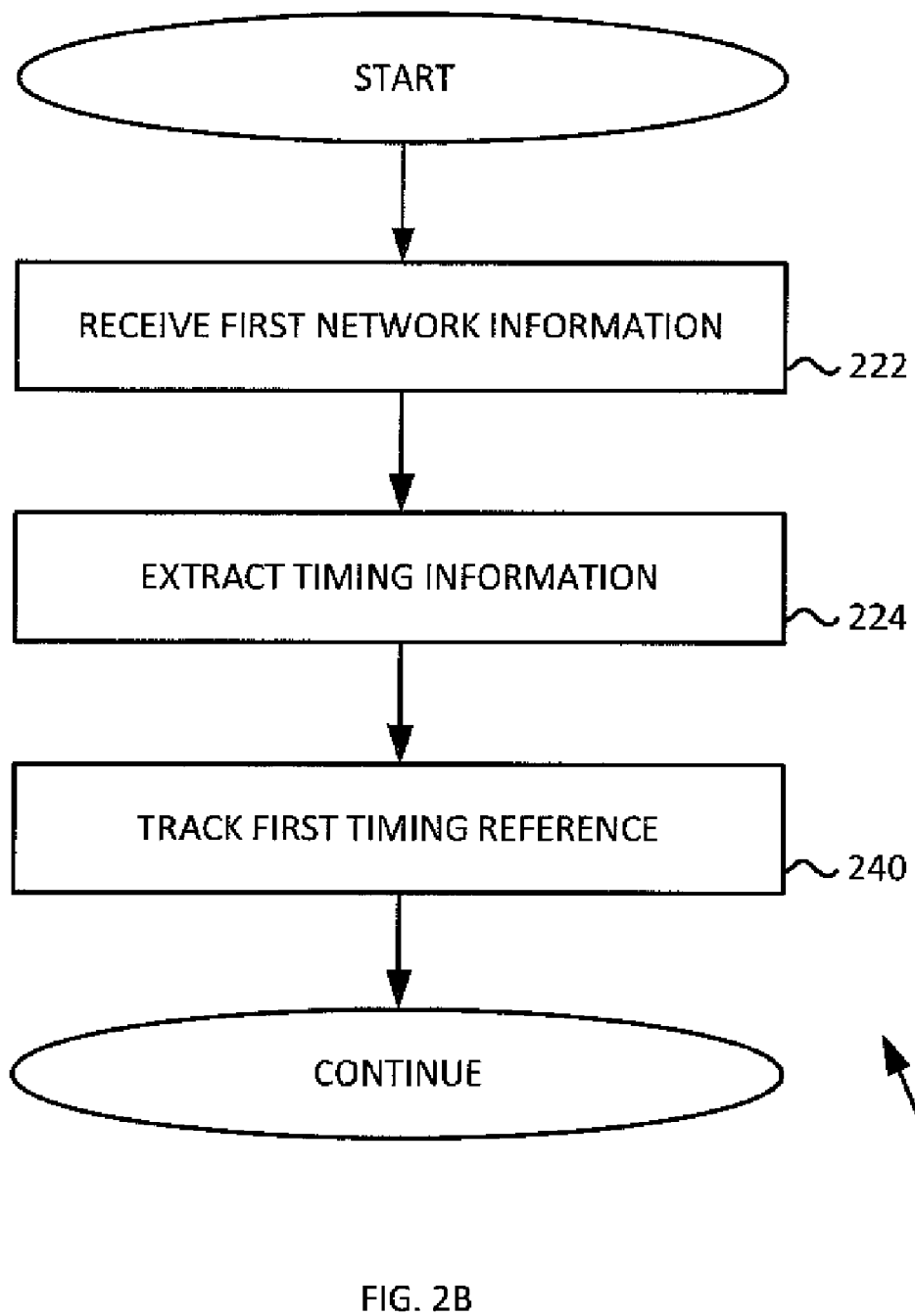
FIG. 2B is a logical flow diagram of one embodiment of the method of extracting a timing reference from a first network utilizing a second receiver in accordance with the method of FIG. 2.

Referring now to FIG. 2B, one exemplary implementation of step 220 is illustrated with respect to an invention enabled femtocell or base station device operating in conjunction with a cellular network.

In a typical cellular network, a mobile station must receive information from the network to operate within the cellular network. Such information may comprise timing, location information, appropriate frequency bands, code domains, etc. Furthermore, the network may also require information from the mobile prior to granting network access. For example, a mobile station may first search for a broadcast to establish a physical resource (e.g. time, frequency, code, etc.) suitable for initiating access with the base station. In a CDMA-based system, this may involve demodulating a pilot signal to establish initial timing, and thereafter demodulating a broadcasted control channel. Once the mobile station has identified an appropriate physical resource, it initiates access to the cellular network, including such steps necessary for accounting, authorization and authentication.

In typical operation, a femtocell performs essentially the same operations as a base station. However, at step 222 of the foregoing method, the invention enabled femtocell performs actions similar to a mobile station. To this extent, the femtocell receiver can be simple in nature if desired; e.g., can comprise only a receiver necessary to receive the downlink signal and demodulate it (i.e., no transmitter is required, but can be included if required to support additional functionality). Conversely, if a less expensive approach is to use a COTS or similar transceiver (even though the transmit functionality is not required), this approach may be employed as well.

Thus, rather than providing the downlink signal 122, the invention enabled femtocell or base station demodulates the downlink signal 126 transmitted from the master base station. The extraction of network information is performed by demodulating the received downlink signal 126, in a manner identical to a mobile station.

At step 224, the invention enabled femtocell extracts timing information, and continuously tracks the network timing reference at step 226. Implementations may vary depending on the network protocol; for example, CDMA systems (e.g., IS-95, IS-2000, etc.) are typically both frequency and time aligned. A mobile station will track the network frequency and time via a tracking loop in the CDMA system. A CDMA mobile station tracks time at a sub-chip level very accurately (i.e., to a nanosecond level of accuracy). In an identical manner, the frequency and time reference can be tracked with an enabled femtocell or base station which has a CDMA mobile station type receiver frontend. The femtocell will maintain the identical timing accuracy as a mobile receiver, as the implementation is the same.

In alternate embodiments, the timing accuracy of the initial timing reference is used to facilitate faster synchronization times of the femtocell or base station. The femtocell initially tracks the network timing reference, but concurrently enables slower and more accurate timing or frequency references (e.g., GPS, etc.). In one variant, the slower timing frequency reference is a GPS receiver. Once the more accurate timing or frequency reference is locked, the femtocell can transition over to the more accurate reference. A GPS receiver may be unable to operate in all conditions (e.g., indoors, poor reception, etc.), accordingly, an invention enabled femtocell using a GPS time base may elect only to use the derived time base as a supplement to the more accurate, but sporadic GPS time base.

The implementation of a mobile station type receiver greatly simplifies maintaining an accurate first timing reference. Rather than calculating its own timing reference, the femtocell or base station of the present invention advantageously "piggybacks", or slaves itself, to the first tinting reference being broadcast by another base station. Stated differently, the job of providing an accurate timing source is offloaded to an extant high-accuracy device (e.g., macrocell), thereby relieving the femtocell of this burden.

Figure 2C:
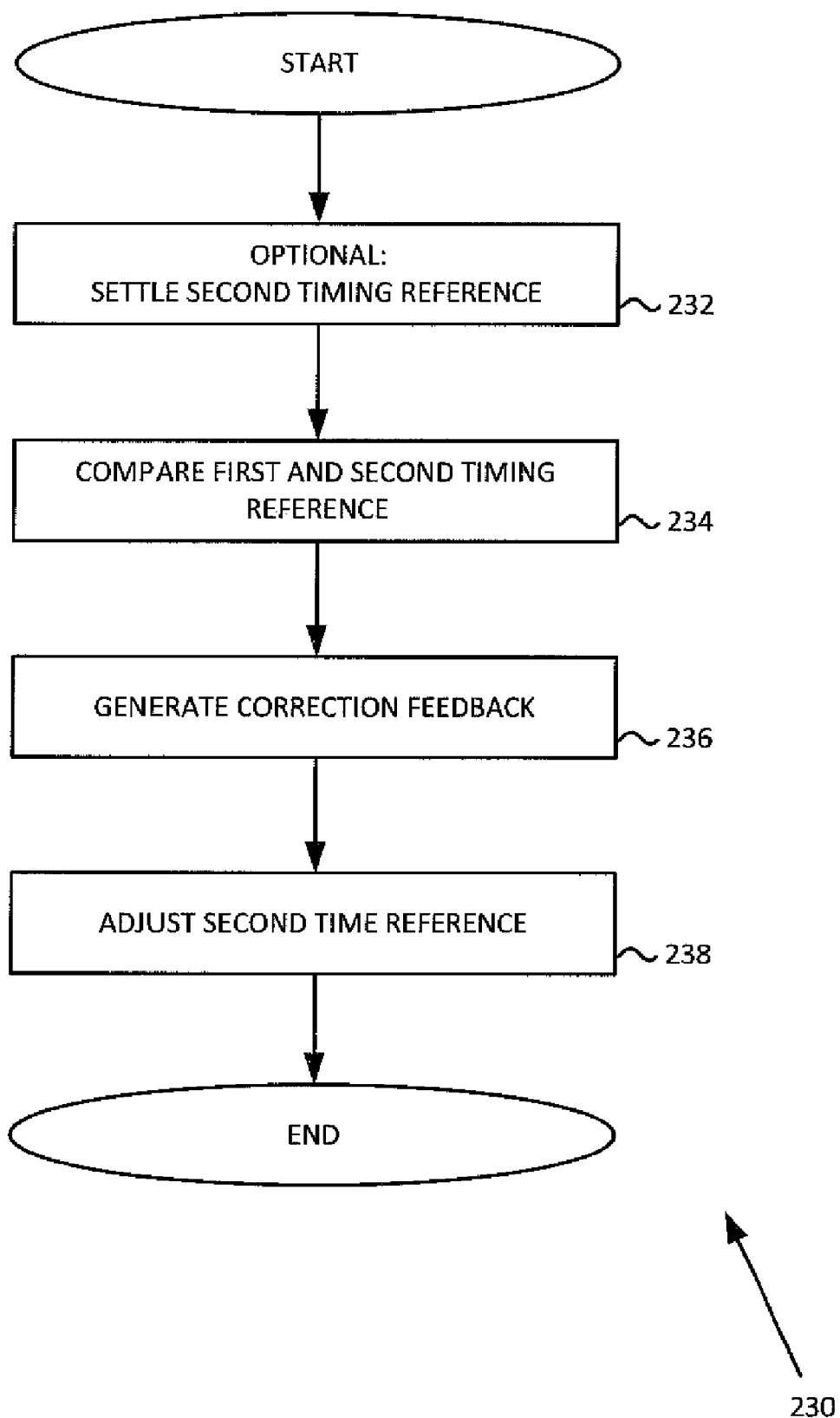
FIG. 2C is a logical flow diagram of one embodiment of the method of adjusting a second timing reference to synchronize with a first timing reference in accordance with the invention.

Furthermore, while the master timing reference in this example is generated at a base station, the master timing reference may alternatively be sourced from another femtocell, a relay station, or any other appliance synchronous to, and operated within the first network (and having suitable characteristics such as accuracy, etc.). FIG. 2C illustrates one exemplary implementation of generating a second (slave) timing reference with respect to a femtocell operating in conjunction with a cellular network.

In one implementation of the present invention, the invention enabled femtocell or base station generates a clock which is driven by an internal clocking system (e.g., crystal oscillator), and tracked to the master timing reference (e.g., macrocell). In certain situations, this internal clock or portions thereof may be switched off, such as to save power. Thus, at the optional step of 232, the femtocell may be required to initialize and settle its internal clocks.

At step 234, the invention enabled femtocell or base station compares its second (generated internal) timing reference and the first (external) timing reference to generate an error signal. Femtocell implementations are system dependent. Hence, such an error signal may comprise an error reference signal for use with an automatic frequency control (AFC) type device. Typical AFC devices automatically maintain a desired frequency. Some implementations of AFC type devices include phase locked loops (PLLs), digital phase locked loops (DPLLs), analog phase locked loops (APLLs), etc. Other various schemes and mechanisms for frequency adjustment are readily appreciated by artisans skilled in the arts. Alternatively, the error signal may be a relative difference in time between a first time value (master) and a second time value (slave). Yet another error signal may be an absolute time value (master), where the femtocell must set its time. Yet another error signal may be derived from a "tick" of the type previously described that is received from a master indicating to the femtocell, the correct time.

At step 236, the invention enabled femtocell or base station determines a correction factor based on the error signal generated in step 234. Such a correction factor may be a feedback error reference signal for use with an automatic frequency control (AFC) type device (e.g., PLLs, DPLLs, APLLs, etc.). Alternatively, such a correction factor may be the difference in time between a first time and a second time. Yet another correction factor may be an absolute time value. In a CDMA type system, the system is both time and frequency aligned, therefore the correction factor comprises both frequency and time elements.

At step 238, the invention enabled femtocell or base station adjusts its time, according to the correction factor. This may involve an AFC type circuit, or a setting of a time value. For CDMA type systems, the AFC error signal is fed into a voltage controlled oscillator (VCO) to adjust the frequency. Additionally, a periodic tick may be generated, and/or messaging comprising the current system time. Once the femtocell has locked its second timing reference to the first timing reference, the system must maintain lock by continuously or periodically adjusting its timing reference to correct for any drift.

Figure 2D:
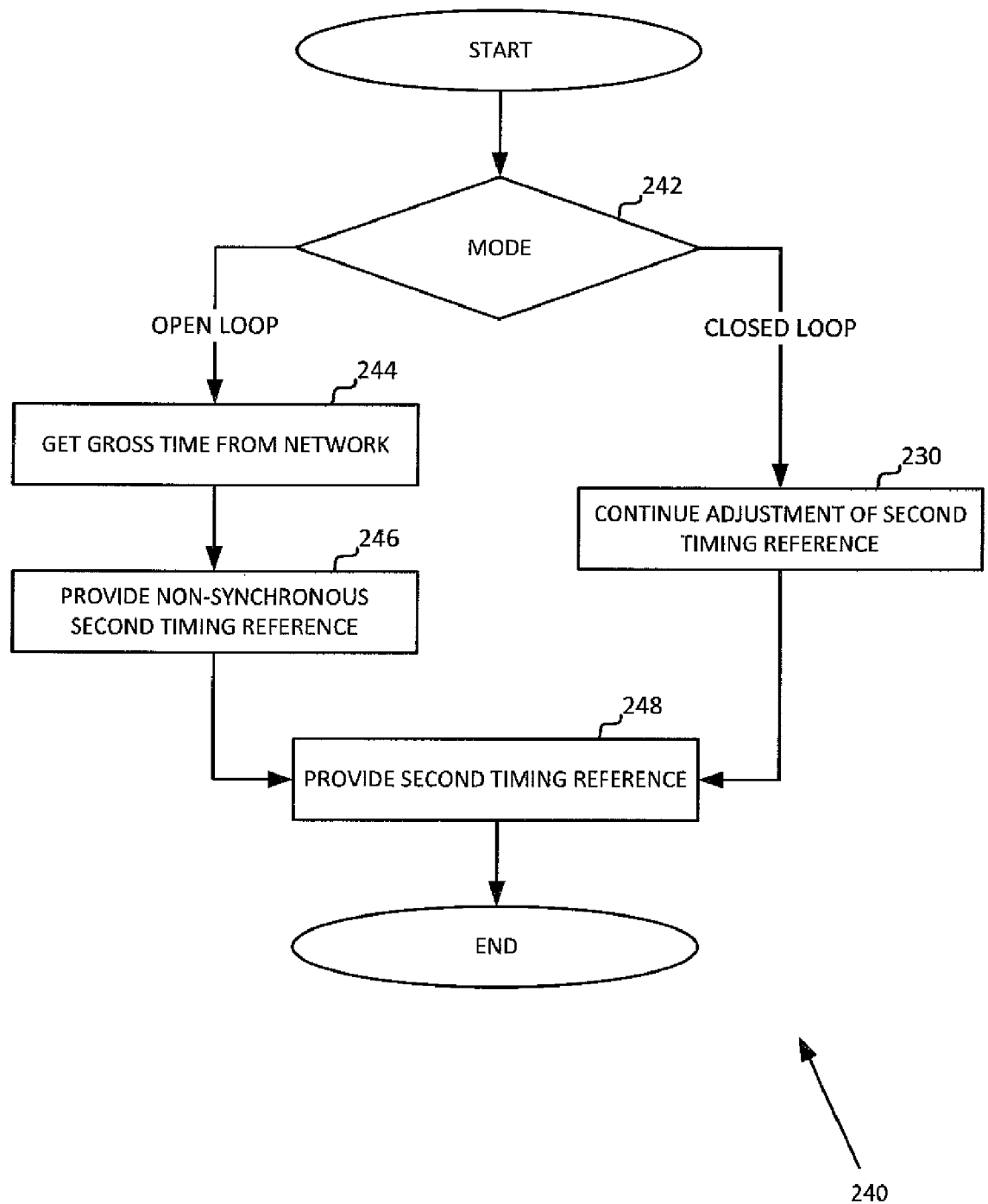
FIG. 2D is a logical flow diagram of one embodiment of the method of providing an open-loop or closed-loop timing reference in accordance with the invention.

As previously mentioned, at step 240, the invention enabled femtocell or base station provides its second timing reference for use within other circuits of the femtocell. Referring now to FIG. 2D, one exemplary implementation of step 240 is illustrated with respect to a femtocell operating in conjunction with a cellular network.

At step 242, the invention enabled femtocell or base station elects "open-loop", or "closed-loop" operation based at least in part on the success of the search (scan) for a master timing reference in step 210. As previously described, synchronization with the network is useful to enable cooperation between the base stations and the femtocells; thus, if the femtocell cannot identify any neighboring base stations, then cooperation is not available. Open-loop operation is still preferred over non-operation, as femtocells should provide limited service even while operating in isolation from the rest of the network (and its more precise timing reference). Furthermore, it is anticipated that many femtocells will be operated in isolation, as femtocells are designed to augment cellular service in areas with poor coverage.

In closed-loop operation, the second timing reference is continuously adjusted to track the first timing reference by repeating the process 230 of FIG. 2C.

In open-loop operation, the second timing reference is operated off of a local clocking source, such as a local oscillator. At step 244, the femtocell may receive a base or gross time estimate from the network, via its broadband connection. At 246, the local oscillator provides a non-synchronized second frequency reference. The results of steps 244 and 246 are sufficient to generate the second timing reference.

At step 248, the second timing reference is distributed for use within the femtocell or base station, and/or encapsulated for transmission to another device. Local mobile stations can synchronize with the second timing reference (via their wireless link) for access to the femtocell.

It is also noted that in the context of timing and/or frequency systems, accuracy is not synonymous with synchronization. Stated differently, two distinct systems or networks can both be highly accurate, yet not synchronized. Conversely, both can be synchronized but inaccurate. Hence, the present invention seeks to provide the requisite level of timing/frequency accuracy within the slave network, in one instance by way of synchronizing or correcting a less accurate clock or frequency source with a more accurate one. However, as described elsewhere herein, the present invention also recognizes that a high level of accuracy is not specifically required for all slave/femtocell operations, and hence in effect frees the improved femtocell apparatus disclosed herein from the perceived requirement for an internal high-accuracy clock/frequency source.

The various methods of the present invention can also advantageously be applied on an opportunistic or periodic basis. For example, the external (master) reference may not always be available, and hence logic within the femtocell can periodically or anecdotally re-synchronize itself to the master when the latter is available. This approach may also provide significant power savings over a continuous update/synchronization scheme. Similarly, the femtocell itself may "sleep" and only update itself periodically, regardless of the status of the master network/reference.

"Chained" Network Element Operation—

In the case where femtocells or base stations are "chained" or serially tied to the master network (e.g., a first femtocell slaves its timing reference to the master network, and a second femtocell slaves its timing reference to the first slaved femtocell), the interposed (first) slave femtocell can also be configured to act as a bridged timing, frequency, etc. reference. In a bridging operation, the interposed femtocell may have the ability to sleep or operate in a reduced state, while still providing a bridged reference, facilitating continued synchronization or other functions of the second slave femtocell. This may be accomplished using any number of different approaches, including e.g., maintaining the first slave's oscillator and keeping error correction/receiver circuitry operational while the rest of the interposed femtocell sleeps.

As previously described, the "slave" femtocell or base station of the invention may be equipped with a secondary air interface or "transceiver" by which it can receive the precision timing or frequency reference from the macrocell. In the simple case (no chaining), this transceiver can be configured or function merely as a receiver, since no uplink to the macrocell is needed, and no downlink to another femtocell or network element is required. However, the transceiver of the femtocell can also be configured and function as a true transceiver (i.e., both capable of receive and transmit operations), as is advantageously embodied in many COTS type solutions, such as those found in mobile units (UEs). In this fashion, one variant of the invention uses this secondary transceiver to both: (i) receive precision timing, frequency, etc. data from the parent or master macrocell, and (ii) downlink or transmit that information or portions thereof to a subsequent "chained" femtocell of device. This approach has the advantage that two or more chained femtocells can be of literally identical configuration (i.e., the first slave could be effectively swapped with the first, etc.), since both are using the same (secondary) air interface for both receipt of the data from the master (macrocell), and transmission of the data to a second slave. For example, the primary interface of the first slave femtocell might comprise an LTE or WiMAX interface as previously described, and the secondary interface a GSM interface (transceiver), wherein the receiver portion of the GSM transceiver is used to receive precision timing, frequency, etc. data from the master GSM network, and the transmitter portion of the GSM transceiver is used to transmit to a corresponding GSM receiver in the second slave femtocell chained to the first. More identical femtocells can also be simply serially added in this fashion if desired.

It will be appreciated, however, that another configuration may comprise using the secondary interface as the receiver, and yet a third distinct air interface (e.g., 802.11/WLAN, PAN, etc.) as the transmitter to the second macrocell.

It will also be appreciated that while the aforementioned variant utilizes two or more "chained" (serially disposed) femtocells or base stations, chaining of this type may be implemented with other types of network elements as well, whether in a homogeneous or heterogeneous fashion. For example, instead of two chained femtocells, a femtocell might be chained to a repeater or relay station of the type well known in the wireless arts. Such repeaters or relays do not function as femtocells, but as the names imply merely repeat or relay signals to another station(s), respectively. Alternatively, two or more relays or repeaters might be chained. Various combinations of the foregoing femtocell, repeater and relay elements (as well as other network elements that might be required to utilize and/or pass on timing, frequency, location, SID, NID, SSID, or other such information obtained from the macrocell) will be recognized by those of ordinary skill in the art given the present disclosure, all such combinations and variants being considered to fall within the scope of the present invention.

It will also be recognized that two or more femtocells (or relays, repeater, etc.) may be ganged onto one master cell; i.e., receive precision timing, frequency, etc. data in parallel with one another (versus being "chained" in serial").

Apparatus—

Figure 3:
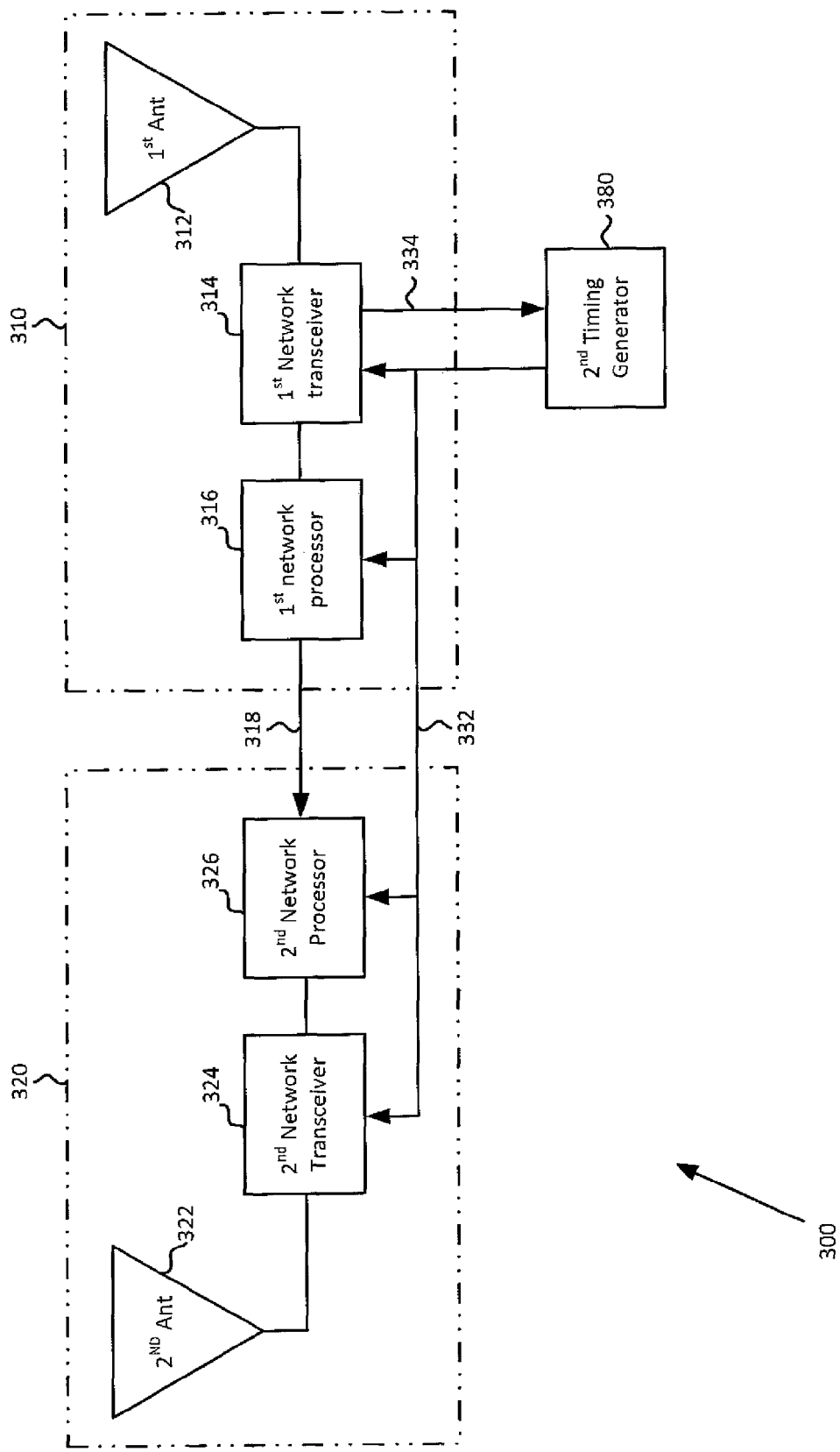
FIG. 3 is a functional block diagram illustrating one embodiment of a femtocell apparatus adapted to implement the methods of the present invention.

Referring now to FIG. 3, exemplary network element apparatus 300 useful in implementing the methods of the present invention are illustrated. The network element apparatus comprises a first network subsystem 310, a second network subsystem 320, and a second timing generator 330 (the first timing reference is transmitted across the air interface, and is not shown).

The first network subsystem 310 of the illustrated embodiment comprises a first antenna 312, a first network transceiver 314, and a first network processor 316. The second network subsystem 320 comprises a second antenna 322, a second network transceiver 324, and a second network processor 326. The second timing generator 330 generates a second timing reference 332 for the first and second network subsystems. In addition, a supplemental timing link 318 enables communication between the first subsystem and the second subsystem. An adjustment path 334 links the first network subsystem, with the second timing generator.

The first antenna 312 and first network transceiver 314 are minimally adapted to receive a master network downlink channel 126 from a base station 101 or access point, so as to extract a first timing reference. The first network transceiver is coupled to the first network processor 316. The first network processor handles digital baseband operations relevant to the operation and control of the first network transceiver. In one variant of the invention, the first network transceiver is adapted to provide adjustment to the second timing generator 330. Additionally, it is appreciated that in some implementations, the first antenna and first transceiver are capable of transmitting on the master network uplink channel 128.

Timing generation may be performed in any of the mentioned elements, and may differ subject to implementation specific constraints. For example, in one embodiment, the timing generation is performed internal to the transceiver or processor coupled to the first network. In an alternate embodiment, the timing generation is performed internal to the transceiver of processor coupled to the second network. In yet another embodiment, timing generation is performed external to either first or second network elements.

The second antenna 322 and second network transceiver 324 are adapted to broadcast a slave network downlink channel 122, and receive a slave network uplink channel 124 from a mobile station 130. The second network transceiver is coupled to the second network processor 326. The second network processor handles digital baseband operations relevant to the operation and control of the second network transceiver. A broadband connection provides the second network processor 326 access to the network operator's infrastructure. Additionally, the broadband connection may supply timing information to the second timing generator 330, for open-loop operation.

The second timing generator 330 is adapted to provide both closed-loop and open-loop operation. In closed-loop operation, the second timing generator provides a second timing reference 332 to the first and second network subsystems by synchronizing the second timing reference to the first timing reference. In open-loop operation, the second timing generator provides the second timing reference to the first and second network subsystems utilizing a stand-alone clock generation circuit.

While multiple subsystems are illustrated, it is appreciated that future developments may consolidate the subsystems, in whole or in part, or distribute them differently across the same or other components. Furthermore, while fixed transceivers are shown, reconfigurable transceivers can also be used for both the waveform of the slave network or access point, and the receiver (or transceiver) for the master network. In one embodiment the slave network and master network may be of the same type and wireless standard (e.g., as in a repeater, or in certain types of cellular networks). In an alternate embodiment, the slave network and master network are of different wireless standards (e.g., such as may be common in cellular and wireless networking devices e.g., Wi-Fi type devices).

A reconfigurable transceiver may change functionality to operate in the first and second networks. Such a reconfigurable transceiver may comprise run-time changeable logic implemented in hardware or software. One such hardware implementation may utilize programmable logic, such as a Field Programmable Gate Array (FPGA). One such software implementation may change between algorithms. One such implementation of a run-time changeable operation alternates between receiving a timing reference from a first network (e.g. LTE UE operation), and servicing of a second network (e.g. LTE femtocell operation). Such run-time changeable logic may obviate the need for having additional separate radio subsystem.

Figure 3A:
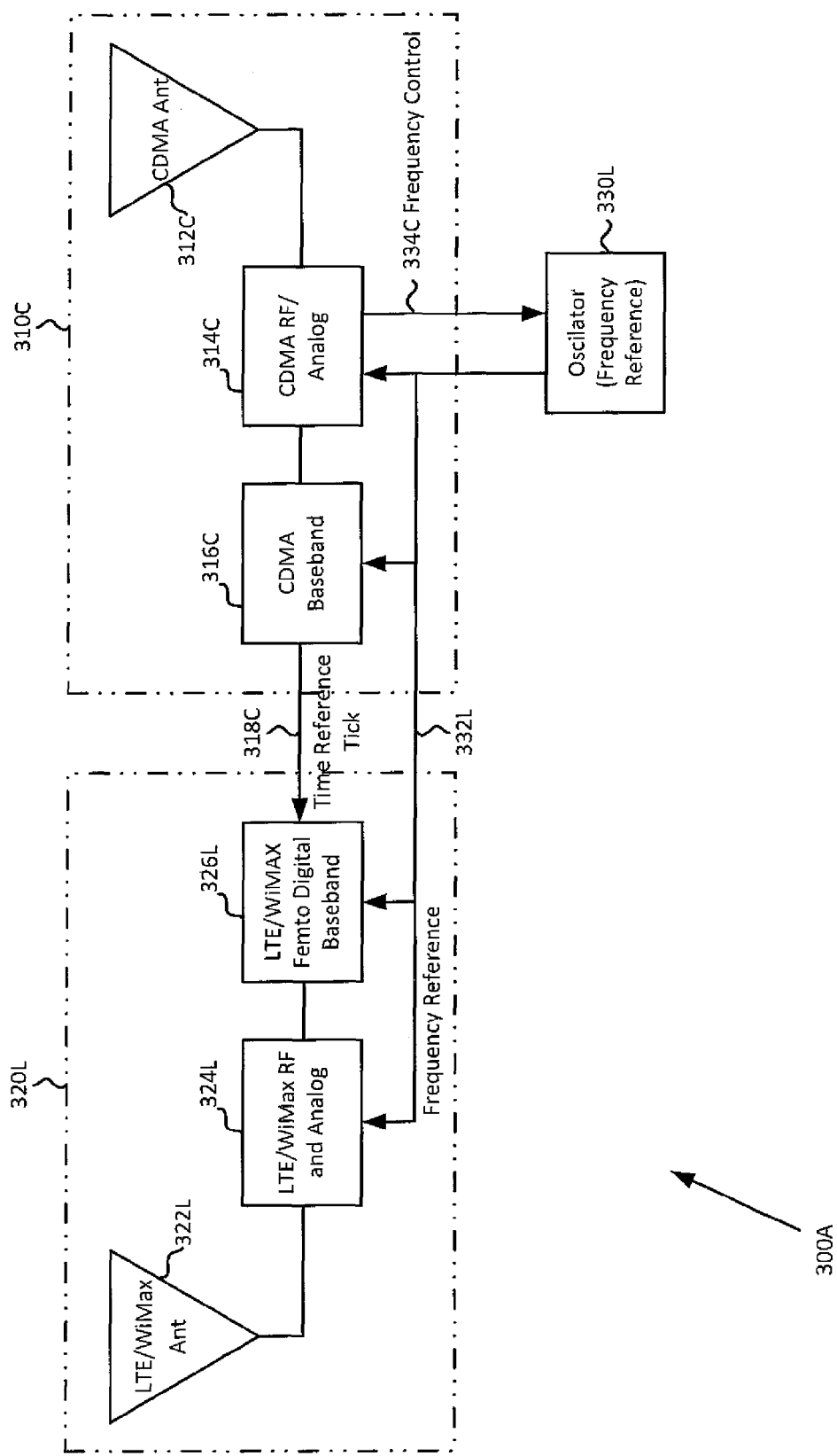
FIG. 3A is a functional block diagram illustrating one embodiment of a femtocell apparatus adapted to determine a timing reference from a CDMA network in order to service an LTE/WiMAX network, in accordance with the present invention.

Referring now to FIG. 3A, one exemplary implementation of the apparatus 300 of FIG. 3 is shown. The apparatus 300A of FIG. 3A comprises an LTE network subsystem 320L, a CDMA network subsystem 310C, and a voltage controlled oscillator (VCO) 330L. The LTE subsystem 320L comprises a LTE Antenna 322L, a LIE RF and Analog Baseband chip 324L, and a LTE/WiMax Femtocell Digital Baseband chip 326L. The CDMA subsystem comprises a CDMA Antenna 312L, a CDMA RF and Analog Baseband chip 314L, and a CDMA Digital Baseband chip 316L. The VCO 330L provides a frequency reference 332L to both the CDMA and LTE subsystems. Periodically, the CDMA baseband will provide a tick (e.g., every 1 sec) via 318C to the femtocell digital baseband.

CDMA networks (e.g., IS-95, IS-2000, etc.) are typically both frequency and time aligned throughout the network. The base stations are aligned in the time and frequency to aid in cell searches and handoffs. Each base station has a "time offset" within a repetitive pseudo-noise (PN) sequence; these time offsets identify the base station to the mobile station. Typically, the base stations obtain their absolute time reference via a GPS receiver. The frequency in the mobile station is tracked via a tracking loop in the CDMA transceiver system 314C. Thus the CDMA network subsystem 310C provides equally accurate feedback 334C to the frequency reference 332L of the Femto (LTE) subsystem 320L. Additionally, the CDMA baseband 316C has a time tracking loop to keep time. The CDMA system tracks time at a sub chip level; timing is tracked very accurately (i.e. nanoseconds). Thus the invention provides the frequency and timing accuracy of the CDMA subsystem, for the Femto (LTE) subsystem.

Figure 3B:
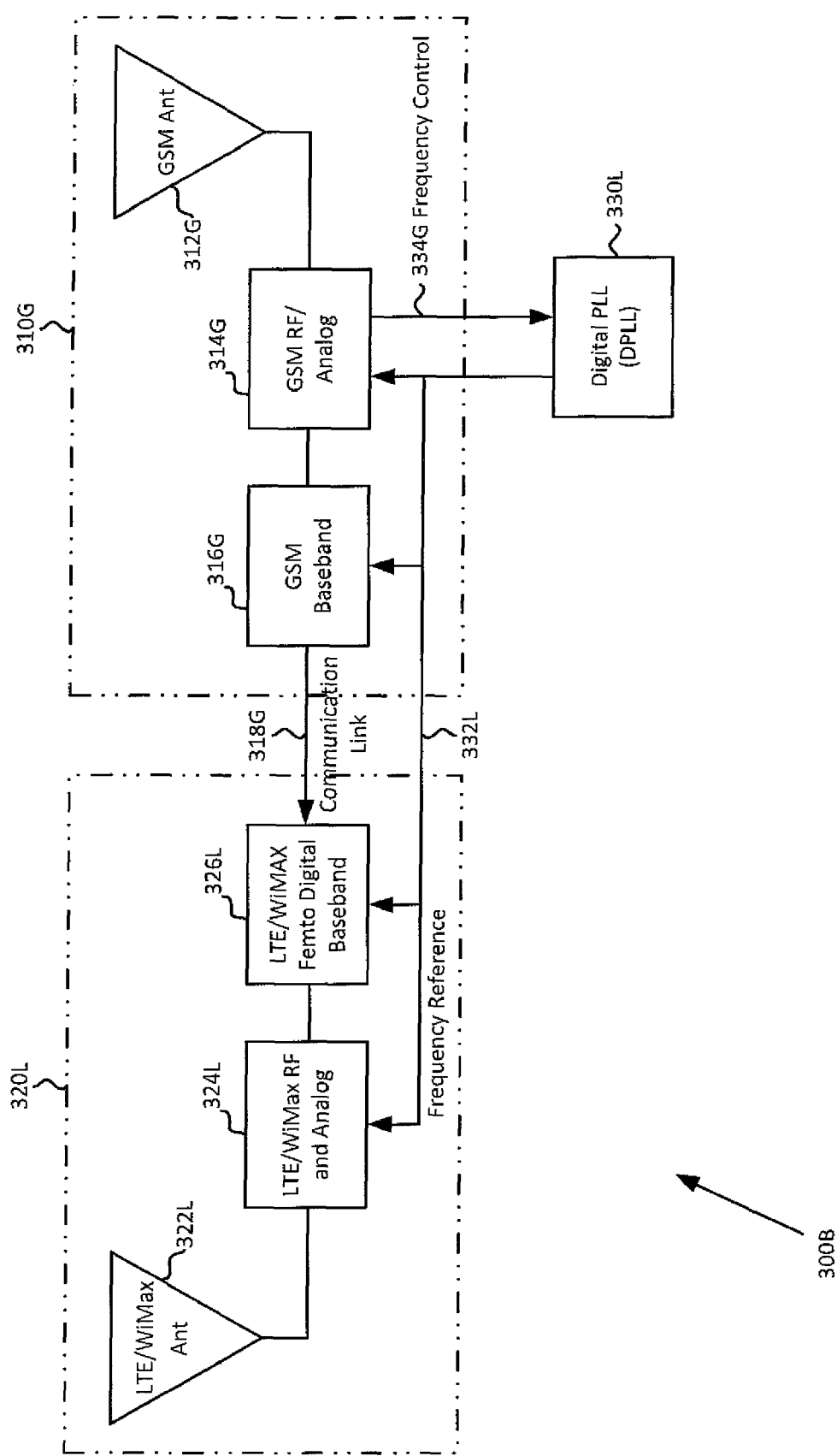
FIG. 3B is a functional block diagram illustrating one embodiment of a femtocell apparatus adapted to determine a timing reference from a GSM network in order to service an LTE/WiMAX network, in accordance with the present invention.

Referring now to FIG. 3B, another exemplary implementation of the apparatus 300 of FIG. 3 is shown. This apparatus 300B of FIG. 3B comprises a LTE network subsystem 320L, a GSM network subsystem 310G, and a Digital Phase Locked Loop (DPLL) 330L. The LIE subsystem 320L comprises a LTE Antenna 322L, a LTE RF and Analog Baseband chip 324L, and a LTE/WiMax Femtocell Digital Baseband chip 326L. The GSM subsystem comprises a GSM Antenna 312G, a GSM RF and Analog Baseband chip 314G, and a GSM Digital Baseband chip 316L. As shown, the GSM solution can consist of multiple chips; however a single chip solution is usually more cost effective and may be used instead. The VCO 330L provides a frequency reference 332L to both the GSM and LTE subsystems. The GSM baseband will provide a message via 318G to the femtocell digital baseband periodically establishing a network time stamp.

Similarly, another exemplary implementation of the apparatus includes a High Speed Packet Access (HSPA) and HSPA+ network subsystem, a GSM network subsystem, and a Digital Phase Locked Loop (DPLL). The HSPA subsystem comprises a HSPA Antenna, a HSPA RF and Analog Baseband chip, and a HSPA Digital Baseband chip. The GSM subsystem comprises a GSM Antenna, a GSM RF and Analog Baseband chip, and a GSM Digital Baseband chip. A myriad of possible apparatus providing various wireless service are possible given the present disclosure.

GSM systems are frequency aligned throughout the network. Often, GSM systems are time aligned as well, although time alignment is not required by the prevailing GSM standards. GSM based solutions (e.g. EDGE, GARS, WCDMA, etc.) may thus track time and/or frequency. Typically, GSM implementations utilize a comparatively inexpensive DPLL. The time reference can comprise either multiple messages indicating the network time (e.g., via a time stamp), or messages indicating what time it will be at a given tick, and a tick. In the above example, the communication link 318G communicates the time to the Femto (LTE) subsystem 320L. Thus, the invention advantageously provides the timing reference of the GSM subsystem 310G for the Femto (LTE) subsystem 320L (frequency is as accurate as the CDMA subsystem 310C; however, time is not).

In some embodiments, an invention enabled network operation may supplement other operation. As previously mentioned, GPS provides an accurate time base, but is inconvenient for a number of reasons (GPS may not function in certain circumstances, may take a long time to initialize, etc.). Accordingly, an invention enabled network entity having GPS capabilities may preferentially utilize its GPS time base when available in combination with the invention to provide robust operation. For example, a femtocell may provision service via the master/slave network mechanisms so as to quickly provide initial service. Once the GPS signal reception has locked, the inventive femtocell changes to the GPS time base.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

APPENDIX I

References

Each of the following references is incorporated by reference herein in its entirety.

[1] R4-071025, "Consideration on frequency accuracy requirements for Home Node B" Samsung, RAN WG4 (Radio) meeting #43 bis, Orlando, US, 25-29 Jun. 2007

[2] 3GPP TS 25.102, "3rd Generation Partnership Project; Technical Specification Group Radio Access Network; User Equipment (UE) radio transmission and reception (TDD) (Release 8)", V8.0.0, May 2008.

[3] 3GPP TS25.104, "3rd Generation Partnership Project; Technical Specification Group Radio Access Network; Base Station (BS) radio transmission and reception (FDD) (Release 8)", v8.3.0, May 2008.

[4] 3GPP TS 25.141, "3rd Generation Partnership Project; Technical Specification Group Radio Access Network; Base Station (BS) conformance testing (FDD) (Release 8)", v8.3.0, May 2008.

[5] 3GPP TS 45.010, "3rd Generation Partnership Project; Technical Specification Group GSM/EDGE Radio Access Network; Radio subsystem synchronization (Release 8)", v8.0.0, May 2008.

What is claimed is:

1. A wireless device capable of chaining a first timing reference from a first network to a second network, said wireless device comprising:
   a radio frequency receiver configured to receive a first signal from said first network, wherein a first timing reference is embedded within said first signal;
   a timing generator, said timing generator being configured to generate a second timing reference;
   a radio frequency transceiver configured to transmit signals to a second network; and
   apparatus configured to:
      extract said first timing reference from said first signal;
      synchronize said second timing reference to said first timing reference;
      transmit a second signal to said second network, wherein said second timing reference is embedded within said second signal; and
      cause ones of said second network to derive a chained timing reference, responsive to said ones receiving said second signal.

2. The wireless device of claim 1, wherein said device comprises a femtocell base station, and said first network comprises a cellular master network.

3. The wireless device of claim 1, wherein said device comprises an access point (AP) configured for access by at least one Wireless Local Area Network (WLAN) client device.

4. The wireless device of claim 1, wherein said first network comprises a Code Division Multiple Access (CDMA) master network, and said first signal comprises a CDMA signal.

5. The wireless device of claim 1, wherein said first network comprises a Global System for Mobile Communications (GSM) master network, and said first signal comprises a GSM signal.

6. The wireless device of claim 1, wherein said first network comprises a Universal Mobile Telecommunications System (UMTS) master network, and said first signal comprises a UMTS signal.

7. The wireless device of claim 1, wherein said first network comprises a Long Term Evolution (LTE) master network, and said first signal comprises a LTE signal.

8. The wireless device of claim 1, wherein said first network comprises a Wireless Microwave Access (WiMAX) master network, and said first signal comprises a WiMAX signal.

9. The wireless device of claim 1, wherein said timing generator is configured to generate a second timing reference:
   (i) based at least in part on said extracted first timing or frequency reference if said first signal is present; or
   (ii) not based on said extracted first timing or frequency reference if said first signal is not present.

10. The wireless device of claim 9, wherein said radio frequency receiver is further configured to alter a detection protocol if said first signal is initially not detected.

11. The wireless device of claim 10, wherein said alteration of said detection protocol comprising progressing through at least a portion of a hierarchy of possible sources of suitable first signals.

12. A wireless device comprising:
   a radio frequency receiver configured to:
      (i) detect the presence of a first signal having a first timing or frequency reference embedded therein sent from a first network;
      (ii) receive said first signal if present; and
      (iii) extract said first timing or frequency reference from said received first signal;
   a generator, said generator being configured to generate a second timing or frequency reference:
      (i) based at least in part on said extracted first timing or frequency reference if said first signal is present; or
      (ii) not based on said extracted first timing or frequency reference if said first signal is not present;
   a radio frequency transceiver configured to receive and transmit signals on a second network using said generated second timing or frequency reference; and
   wherein said receiver is further configured to alter a detection protocol if said first signal is initially not detected, said alteration of said detection protocol comprising progressing through at least a portion of a hierarchy of possible sources of suitable first signals.

13. The wireless device of claim 12, wherein said device comprises a femtocell base station configured to service one or more mobile wireless devices.

14. The wireless device of claim 12, wherein said receiver is further configured to retry detection of said first signal based on at least one criterion if said first signal is initially not detected.

15. The wireless device of claim 14, wherein said at least one criterion comprises a period of time elapsing.

16. The wireless device of claim 12, wherein said device comprises a femtocell base station, and said first network comprises a cellular master network.

17. The wireless device of claim 12, wherein said device comprises an access point (AP) configured for access by at least one Wireless Local Area Network (WLAN) client device.

18. The wireless device of claim 12, wherein said first timing reference comprises one or more time values.

19. The wireless device of claim 12, wherein said first timing reference comprises a periodic signal.

20. The wireless device of claim 12, wherein said first network comprises a Code Division Multiple Access (CDMA) master network, and said first signal comprises a CDMA signal.

21. The wireless device of claim 12, wherein said first network comprises a Global System for Mobile Communications (GSM) master network, and said first signal comprises a GSM signal.

22. A method of synchronizing time and frequency elements of network devices within a master network, comprising:
    detecting the presence of a first signal having a first timing or frequency reference embedded therein sent from a first network;
    receiving said first signal if present;
    extracting said first timing or frequency reference from said received first signal;
    generating a second timing or frequency reference:
    (i) based at least in part on said extracted first timing or frequency reference if said first signal is present; or
    (ii) not based on said extracted first timing or frequency reference if said first signal is not present;
    transmitting and receiving signals on a second network using said generated second timing or frequency reference; and
    altering a detection protocol if said first signal is initially not detected, said alteration of said detection protocol comprising progressing through at least a portion of a hierarchy of possible sources of suitable first signals.

23. The method of claim 22, further comprising servicing one or more mobile wireless devices via said second network services.

24. The method of claim 22, wherein said receiving said first signal comprises retrying the detection of said first signal based on at least one criterion if said first signal is initially not detected.

25. The method of claim 24, wherein said at least one criterion comprises a period of time elapsing.

26. The method of claim 22, wherein said second network is subsumed within said first network.

27. The method of claim 22, further comprising servicing one or more Wireless Local Area Network (WLAN) client devices via said second network services.

28. The method of claim 22, wherein said first timing reference comprises one or more time values.

29. The method of claim 22, wherein said first timing reference comprises a periodic signal.

30. The method of claim 22, wherein said first network comprises a Code Division Multiple Access (CDMA) master network, and said first signal comprises a CDMA signal.

31. The method of claim 22, wherein said first network comprises a Global System for Mobile Communications (GSM) master network, and said first signal comprises a GSM signal.

32. A network apparatus, comprising:
    a radio frequency receiver configured to receive a first signal from a first network, wherein a first timing reference having a first level of precision is embedded within said first signal;
    an extraction apparatus configured to extract said first timing reference from said received signal;
    a timing generator, said timing generator having a second level of precision less than said first level of precision when provided no external reference, yet being configured to generate a second timing reference having a level of precision comparable to said first level when provided said extracted first timing reference;
    wherein use of said receiver and said timing generator cooperate to reduce the cost of manufacturing said apparatus as compared to one having an internal timing generator having said first level of precision; and
    a radio frequency transceiver configured to receive and transmit signals on a second network using said second timing reference.

33. A wireless apparatus for use in a first wireless network, comprising:
    a receiver configured to receive a wireless signal from a second wireless network;
    a generator configured to generate a timing or frequency reference for use in said first network; and
    logic in operative communication with said receiver, said logic being configured to cause said receiver to search to detect said wireless signal, and:
        if said signal is detected, extract at least first and second parameters embedded within said signal, and use said extracted first parameter to synchronize said timing or frequency reference, and use said extracted second parameter to permit interoperation between said wireless apparatus and a device operating within said second network, respectively, wherein said first parameter comprises both precision timing and frequency references generated by said second network; or
        if said signal is not detected, utilize said timing or frequency reference within said first network.

34. The wireless apparatus of claim 33, wherein said second parameter comprises a parameter selected from the group consisting of (i) System ID (SID); and (ii) a location-related parameter.

35. The wireless apparatus of claim 33, wherein said first network comprises a Code Division Multiple Access (CDMA) master network.

36. The wireless apparatus of claim 33, wherein said first network comprises a Global System for Mobile Communications (GSM) master network.

37. The wireless apparatus of claim 33, wherein said detected signal comprises a CDMA signal.

38. The wireless apparatus of claim 33, wherein said detected signal comprises a GSM signal.

* * * * *